Nov. 15, 1927.　　　　　　　　　　　　　1,648,898
J. HARRIS
COMMUTATOR ELECTRICITY METER
Filed Sept. 18, 1924
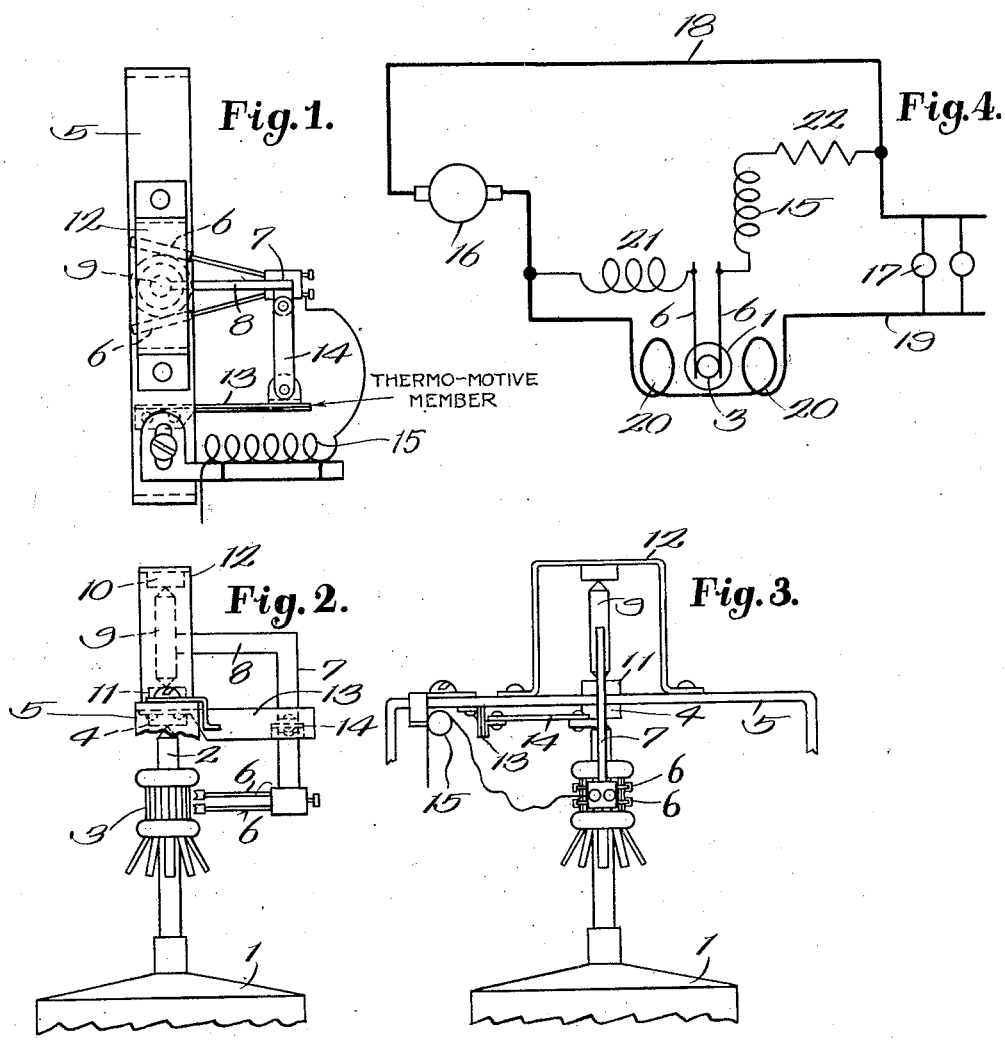
Inventor:
Jesse Harris
By
　　　　Attorney.

Patented Nov. 15, 1927.

1,648,898

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

COMMUTATOR ELECTRICITY METER.

Application filed September 18, 1924. Serial No. 738,514.

My invention relates to electricity meters of the commutator type and resides in the provision of means for overcoming the errors in torque which arise from either or both the heat generated by the current flowing in the meter windings and conductors and that present in the meter surroundings. By means of my invention, the meters may be calibrated to operate accurately with a given torque for a given load where the temperature conditions may be different from the temperature conditions attendant the calibration. The error in torque due to the self heating of the meter is constant with a constant extraneous temperature, but this error obviously would change with any modification of the self heating temperature effected by fluctuating extraneous temperature.

The difficulty is increased in the case of testing meters or rotating standards which are used under extraneous temperature and self heating conditions differing so variously and widely from those attendant upon the calibration. The standards are connected in circuit for such short periods of time as not to allow their elements to be heated as they were in the process of calibration. The result is faulty tests of the service meters due to faulty operation of the standards. By equipping the standards in accordance with my invention, they will operate correctly under all conditions of temperature environment and of self heating or the lack of the latter. With such a testing instrument, the service meters may be accurately tested and adjusted whether or not they are equipped in accordance with my invention, though it is preferable to so equip service meters in order that they may operate accurately without the aid of standards, when they are first installed.

In carrying out my invention, thermomotive means, such as a bimetallic thermostat, serves to shift the meter brushes in response to temperature changes to change the point of commutation sufficiently to maintain the torque constant for a given load and given load variations to prevent errors in torque from arising due to the causes stated.

I will explain my invention more particularly in connection with the accompanying drawing in which Fig. 1 is a plan view of the brush and commutator portions of the meter as it is preferably constructed; Fig. 2 is an elevation of the upper portion of the meter where the mechanism of my invention is located, the brushes being broken away; Fig. 3 is a front view of the meter portion shown in Fig. 2; and Fig. 4 is a diagram of the circuit arrangement which is preferred for testing meters.

The drawing illustrates the motor element of a watt meter of the watthour type with which the totalizing or indicating portion, not illustrated, is operatively coupled in any suitable way. The motor element shown includes a wound armature 1 carried upon an upright spindle 2 which also carries the commutator 3. This spindle 2 is mounted to turn upon and between two normally stationary bearings of which the upper bearing 4 is shown. This bearing is carried upon the bottom side of a stationary bracket 5. The commutator brushes 6 are carried at the lower end of the upright branch 7 of an angular arm which has a horizontal portion 8 that is carried by a short upright spindle 9. This spindle is mounted to turn upon and between the upper and lower bearings 10, 11, the bearing 11 being carried upon the top of bracket 5 and the bearing 10 being carried upon a bracket 12 which is carried upon bracket 5.

A bimetallic thermostatic or thermomotive spring strip 13, composed of, say, a layer of brass and a layer of iron, is mounted at one end on the under side of the top bar of the bracket 5 to flex horizontally in response to temperature changes. This thermo-motive element 13 is connected at its outer or forward end with the arm portion 7, this connection being preferably effected through the intermediation of a link 14. When the thermo-motive element 13 flexes in response to temperature changes, the brushes 6 will be shifted to change the point of commutation to maintain the torque constant for any given load.

Commutator meters without my compensating device are usually calibrated to establish a plus torque error on a rise above the temperature at which the meter is calibrated and a minus error on a decrease of such temperature. The meter of each type made in accordance with my invention is calibrated to procure about five per cent less than the maximum torque under the temperature conditions attendant the calibration, the thermo-motive element maintaining a fixed torque for each given load, the torque correctly varying as the load varies.

In the house or service type of meter, the thermo-motive element may be subject to the temperature naturally arising in the meter, unmodified. In the testing type of meter, the thermo-motive element is preferably also subject to the effect of a heating winding 15 placed in proximity thereto. This is because a house or service type of meter may be calibrated after the temperature of the potential circuit has reached the steady value it acquires in service, whereas, a testing meter may or may not be connected in circuit for periods long enough to bring its potential circuit to this steady temperature. The circuit arrangement for a test meter may be as illustrated in Fig. 4. A source of usually direct current 16 supplies current to the load 17 by way of the mains 18 and 19, the latter main including the current or series field winding 20 of the wattmeter shown. The potential circuit of the meter includes the usual friction compensating coil 21, the armature 1, the extraneous resistance 22, the commutator brushes 6 and the aforesaid heating coil 15 which, as is understood, may be omitted in the house or service type of meter. Where the heating coil is present, the thermo-motive strip is heated proportionately to the armature whether the heat of the armature is due to the current passing through it or is due to the surrounding extraneous temperature.

Changes may be made without departing from my invention.

Having thus described my invention, I claim:—

A commutator electricity watt meter employing a brush mounted to shift to change the point of commutation, in combination with a thermo-motive element connected with said brush to shift the same upon change in temperature; and a heating element in the armature circuit also influencing the thermo-motive element by its temperature.

In witness whereof, I hereunto subscribe my name.

JESSE HARRIS.